Feb. 11, 1964 J. N. ENGELSTED ETAL 3,121,193
PERMANENT MAGNET WORK HOLDING DEVICE
Filed May 5, 1960 2 Sheets-Sheet 1

INVENTORS
JOHN N. ENGELSTED
EDUARD BAUER
BY
Kenway, Jenney, Witter & Hildreth
ATTORNEYS Feb. 11, 1964   J. N. ENGELSTED ETAL   3,121,193
PERMANENT MAGNET WORK HOLDING DEVICE
Filed May 5, 1960   2 Sheets-Sheet 2

INVENTORS
JOHN N. ENGELSTED
EDUARD BAUER
BY
Kenway, Jenney, Witter & Hildreth
ATTORNEYS United States Patent Office 3,121,193
Patented Feb. 11, 1964

3,121,193
PERMANENT MAGNET WORK HOLDING DEVICE
John N. Engelsted, Petersham, and Eduard Bauer, West Boylston, Mass., assignors to O. S. Walker Company, Inc., Worcester, Mass., a corporation of Massachusetts
Filed May 5, 1960, Ser. No. 27,015
7 Claims. (Cl. 317—159)

The present invention relates to work holding devices generally and, more particularly to a novel and improved permanent magnet type work holding device which is adapted for use in turning operations.

It is known to provide work holding devices and more particularly chucks with electromagnetic means for holding work thereon. Electromagnetic chucks have been provided for use in metal cutting operations wherein linear relative movement is provided between a tool and a workpiece, such as in grinding and milling operations. Also, electromagnetic chucks have been provided for use in turning operations. However, as will be apparent, the use of an electromagnetic chuck in a turning operation requires a complex slip ring arrangement or the like in order to conduct the necessary electric current to the electromagnetic coils within the rotatable chuck. The requirement for slip rings and the like complicates the electrical wiring system for a lathe or the like mounting the chuck, and also may result in undesirably complicating installation and removal of the chuck.

It is also known to provide work holding devices of the permanent magnet type. The use of such permanent magnet devices as chucks for holding work pieces during grinding operations or the like has proved entirely satisfactory. However, the mechanism for rendering the chuck operative to hold a work piece or inoperative so as to permit release of the work piece often requires a lever or the like extending from the body of the chuck. Any part of this type extending from the chuck body is of course particularly undesirable where the chuck is used on a turning machine where the extending part could conceivably cause injury to personnel.

It is an object of this invention to provide a novel and improved permanent magnet work holding device which is adapted for use in turning operations. It is another object of this invention to provide a novel and improved permanent magnet rotary chuck which has a novel and improved arrangement for rendering the chuck operative and inoperative. It is a further object of the present invention to provide a permanent magnet rotary chuck of the type described in which the mechanism for rendering the chuck operative and inoperative does not require any parts extending beyond the body of the chuck.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 1 is a plan view of a permanent magnetic rotary chuck constructed in accordance with the present invention;

Figure 3:
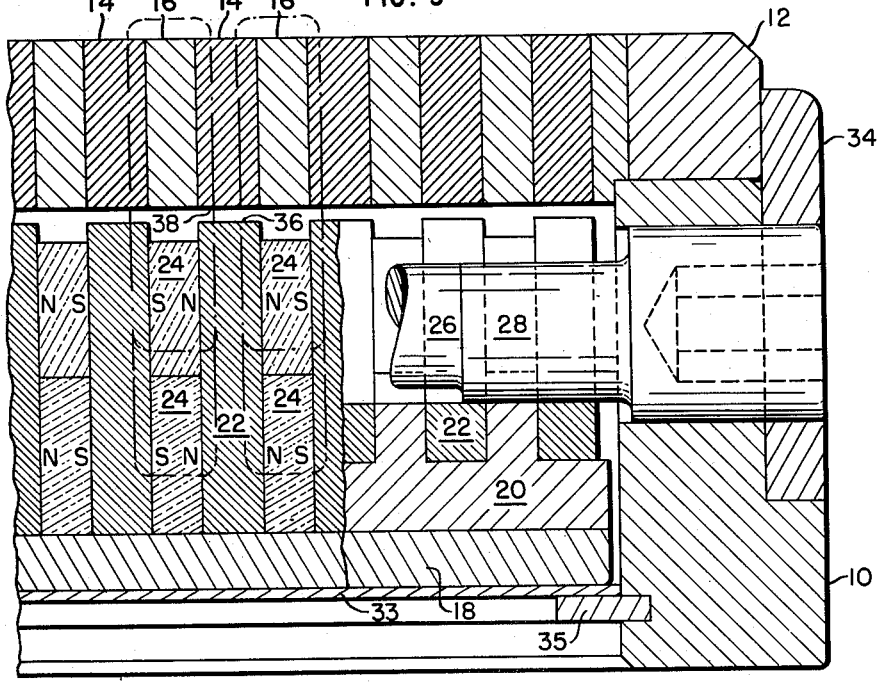
FIG. 3 is an enlarged fragmentary cross-sectional view of a portion of the chuck of FIG. 2.

With reference to the drawings, a permanent magnet work holding device constructed in accordance with this invention is shown in the embodiment of a chuck suitable for use in a metal turning operation. It will be understood, however, that the invention is not limited to rotary chucks, but as will be apparent hereinafter, the invention may have utility as a work holding device, generally, and whether the work to be held is involved in a machining operation or for some other purpose such as the lifting of material. In the specific embodiment shown in the drawings, the chuck comprises a generally cylindrical body 10. Bolted to one end of the body so as to be integral therewith is a ring 12 forming a part of a top plate assembly comprising ferromagnetic pole members 14 interposed with non-ferromagnetic spacers 16. The pole members 14 and spacers 16 are elongated members fabricated of appropriate materials and as shown most clearly in FIG. 1, the pole members and spacers extend chordally of the chuck body. The upper surface of the top plate assembly provides a work engageable surface for the support of work to be held by the chuck. As most clearly shown in FIG. 3 the pole members and spacers extend a relatively short distance into the chuck body and terminate in a surface which extends parallel to the work supporting surface of the chuck.

Figure 2A:
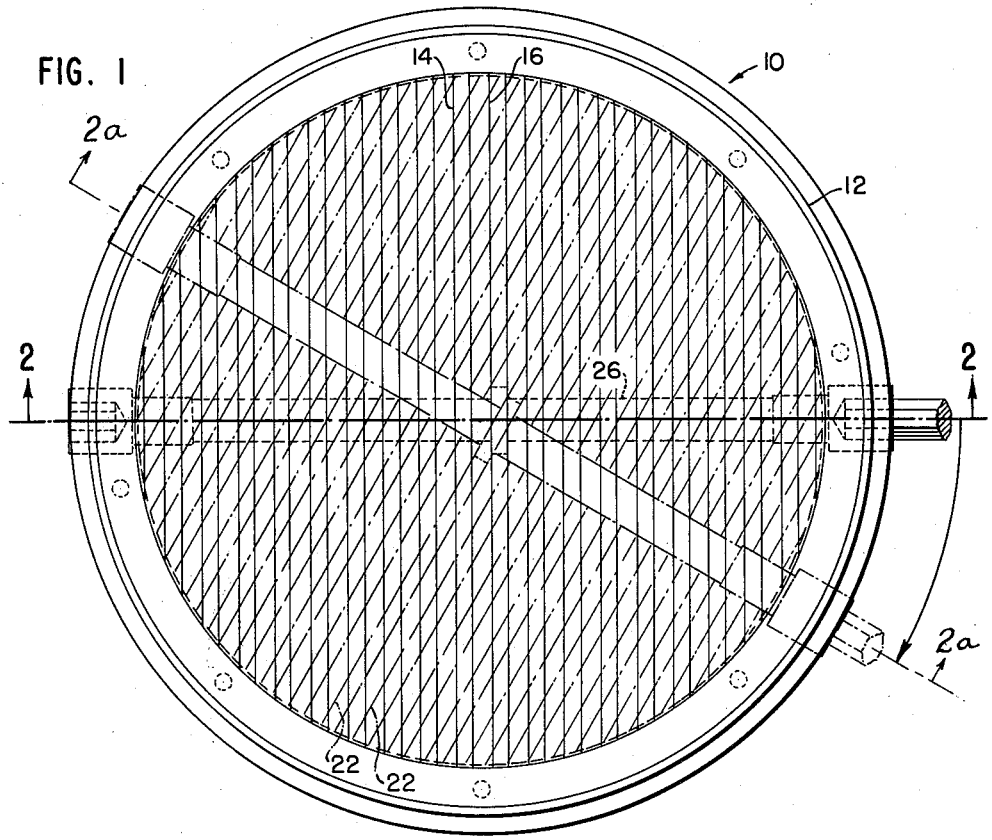
FIG. 2a is a cross-sectional view substantially along the line 2a of FIG. 1, showing the parts in a second position.
Figure 2:
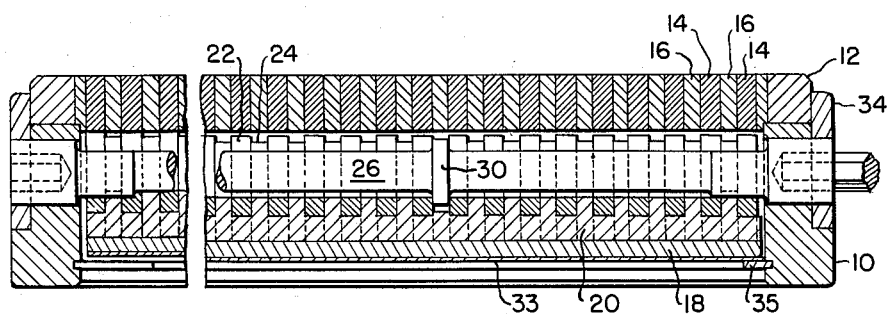
FIG. 2 is a cross-sectional view substantially along line 2—2 of FIG. 1.

Disposed within the chuck body is a magnet assembly which is selectively movable relative to the top plate assembly and the chuck body 10 between positions corresponding to work releasing and work holding conditions of the chuck. As most clearly shown in FIGS. 2 and 3, the magnet pack assembly comprises a circular base plate 18 of non-ferromagnetic material. Extending diametrically of the base plate 18 is a pole piece locating member 20 fabricated of non-ferromagnetic material and fixed relative to the base plate. Extending in a chordwise direction relative to the base plate and fixed relative thereto are a plurality of elongated parallel spaced apart pole pieces 22 fabricated of ferromagntic material. As clearly shown in FIG. 3 the bottom edges of the pole pieces 22 are notched for inter-engagement with notches in the pole piece positioning member 20 whereby the pole pieces extend at right angles to the locating or positioning member 20. The pole pieces are of the same transverse dimensions as the pole members 14 and are spaced apart a distance corresponding to the spacing of the pole members.

Disposed between the pole members 22 and fixed relative thereto are a plurality of permanent magnets 24 of generally rectangular configuration. In the specific embodiment shown, the magnets are of the type which are polarized in a minor transverse direction and more specifically are of a ceramic type. The magnets disposed on opposite sides of a pole piece are so arranged that the like poles of the magnet are in magnetic contact with the pole piece. Accordingly, next adjacent pole pieces will be of opposite polarity. The magnet pack assembly is further provided with a slot or opening in the top upper surface thereof with the slot extending diametrically of the magnet pack and chuck body. Received within the slot is an adjusting member comprising a shaft 26 and a pair of eccentric cam portions 28 on the shaft and disposed adjacent the ends of the shaft but within the chuck body. The eccentrics 28 are engageable with the bottom surface of the slot receiving the shaft 26 so as to be operative to move and hold the magnet pack assembly away from the top plate assembly upon rotation of the shaft to the position shown in FIGS. 2, 3 and 4. As most clearly shown in FIG. 2, the shaft 26 is provided intermediate its ends with an enlarged thrust bearing portion 30 which is engageable in a notch in the pole piece locating member 20. The ends of the shaft 26 are enlarged with the enlarged portions extending through and being slidably engaged in a pair of slots 32 in the chuck body 10. The slots 32 extend arcuately about the chuck axis and permit angular movement of the shaft about the chuck axis. A sleeve or ring 34 is arranged coaxially over and is rotatably supported on the chuck body 10 and is provided with openings into which the ends of the shaft 26 extend and are rotatably received. The ends of the shaft 26 are provided with recesses or sockets in which a wrench or the like is engageable for the rotation of the shaft. The sleeve 34 serves to prevent dirt or other foreign matter from entering the interior of the chuck through the slots 32. The end of the chuck body opposite the top plate is sealed by a cover disc 33 which is retained in the chuck body by a snap ring 35. While not specifically shown, suitable means may be provided for support of the chuck on the spindle of a lathe or the like or the chuck may if desired be clamped to a face plate for use in a turning operation.

Figure 4:
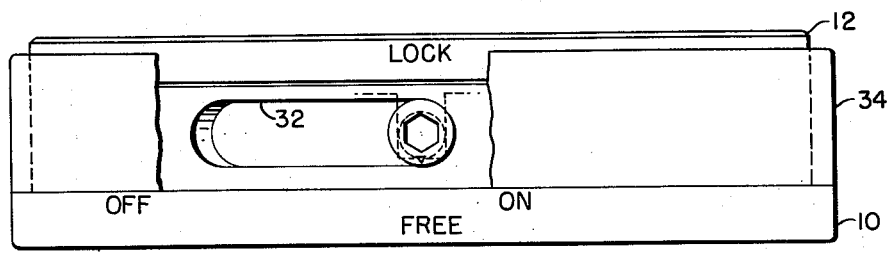
FIG. 4 is a side view of the chuck of FIG. 1.

In the work holding condition of the chuck the magnet pack will be in rotated position about the chuck axis such that the pole pieces 22 of the magnet pack are in alignment with the pole members 14 of the top plate. The shaft 26 will be in rotated adjusted position 180° to the position shown in FIG. 2a and the pole faces 36 of the pole pieces will be in engagement with the lower pole faces 38 of the pole members 14. Accordingly, a magnetic flux field will be provided between the outer pole faces of next adjacent pole members 14, which flux field will extend beyond the work engageable surface of the chuck so that ferromagnetic work pieces may be held on the chuck. To place the chuck in a work releasing condition, a suitable tool is engaged with the shaft 26 and the shaft 26 is rotated to rotate the eccentrics 28 and force the magnet pack downwardly and away from the top plate, thus separating the pole pieces 22 and pole members 14 as shown in the right hand portion of FIG. 2 and in FIG. 3. The tool engaged with the shaft 26 is then moved longitudinally of the circumferentially extending slots 32 to move the magnet pack about the chuck axis thereby angularly offsetting the pole pieces 22 and pole members 14 as shown in dotted lines in FIG. 1. With the pole pieces 22 angularly indexed relative to the pole members 14, the pole members 14 will extend across a plurality of pole piecese of opposite polarity thus providing a shunt between a plurality of next adjacent pole faces of the magnet pack to weaken the flux field extending beyond the work supporting surface of the chuck sufficiently so that the work piece may be easily removed therefrom. To again place the chuck in a work holding condition, the shaft 26 is angularly indexed in the opposite direction to realign the pole pieces and the pole members, and the shaft is then rotated about the axis to permit the magnet pack to be re-engaged with the top plate, through the magnetic attraction of the magnet pack to the top plate. If desired or necessary, separate means may be provided to move the magnet pack into top plate engagement when the shaft 26 is rotated out of work releasing position. The initial movement of the magnet pack away from the top plate by the rotation of the shaft 26 facilitates movement of the magnet pack about the chuck axis inasmuch as the magnetic attraction between the magnet pack and top plate strongly resists relative movement between the magnet pack and top plate when these elements are in engagement. In order to assist the operator in determining the condition of the chuck, the chuck body may, as shown in FIG. 4, be provided with indicia which will cooperate with an indicator on an end of the shaft 26 to indicate the position of the eccentric 28 and thus indicate the vertical position of the magnet pack relative to the top plate. The chuck body may also be provided with additional indicia such as shown in FIG. 4 to indicate the rotated adjusted position of the ends of the shaft 26 corresponding to the work holding and work releasing conditions of the chuck.

As can be seen from the accompanying drawings, the magnets 24 are polarized in a direction extending parallel to the work engageable surface of the chuck. Also, as described above, the magnets are arranged so that the magnet poles on opposite sides of a pole piece 22 are of the same polarity. The construction and arrangement of the magnet assembly as described assures that the magnetic field of the pole faces 36 will be of equal strength. Accordingly, the magnetic field at the outwardly facing pole faces of the pole members 14 will also be of equal strength or in other words, the magnetic fields at the outer pole faces on the work engageable surface will be balanced. The balancing of the magnetic fields on the outer poye faces of the chuck eliminates any tendency for a cutting tool located adjacent the chuck to be magnetized during rotation of the chuck relative to the tool. In the case where the strength of the outer pole faces of the chuck is not in balance the passing of poles of unequal strength and of opposite polarity relative to a tool will tend to magnetize the same which can result in chips adhering to the tool and adversely affecting the cutting operation. Also with a chuck constructed as shown and described, there is no external magnetic field around the body of the chuck which could cause chips to adhere to the chuck body or which might tend to magnetize adjacent objects.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

We claim:

1. A permanent magnet work holding device comprising, a body member, a plurality of elongated ferromagnetic pole members supported on the body member and arranged in parallel spaced-apart relation transversely of the body, said pole members at least in part forming a work engageable surface, and permanent magnet means supported on the body member in transverse parallel relation and providing a plurality of spaced-apart elongated pole faces aligned with said pole members in underlying relation thereto, next adjacent pole faces being of opposite polarity whereby next adjacent pole members are of opposite polarity, the magnetic field at each of said pole faces being substantially of equal strength, the pole members and magnet means being mounted for relative angular movement about an axis extending at right angles to said work engageable surface and between a work holding position wherein the pole faces and pole members are in alignment in flux conducting relation and a work releasing position wherein said pole faces and pole members are angularly offset relative to each other and each of said pole members extending across a plurality of pole faces of the same polarity and in shunting relation with pole faces of opposite polarity.

2. A permanent magnet work holding device comprising a body, a top plate assembly forming a work engageable surface and including a plurality of elongated ferromagnetic pole members arranged in parallel spaced-apart relation, a permanent magnet assembly including a plurality of spaced-apart elongated pole faces engaged with said pole members in underlying relation, next adjacent pole faces being of opposite polarity whereby next adjacent pole members are of opposite polarity, one of the top plate and permanent magnet assemblies being movable away from the other of said assemblies to separate said pole faces and pole members, one of said assemblies being movable relative to the other about an axis extending at right angles to said work engageable surface and between a first position wherein said pole faces and pole members are in alignment and a second position wherein said pole faces and pole members are angularly offset relative to each other so that each of said pole members extend across a plurality of pole faces of the same polarity in shunting relation with pole faces of opposite polarity, and means for sequentially separating said assemblies and angularly moving said one of said assemblies relative to the other including rotatable cam means mounted on said one of said assemblies and engageable with the other of said assemblies to effect separation of said assemblies.

3. A permanent magnet work holding device comprising a body, a top plate assembly forming a work engageable surface and including a plurality of elongated ferromagnetic pole members arranged in parallel spaced-apart relation, a permanent magnet assembly disposed under said top plate assembly and providing a plurality of spaced-apart elongated pole faces engaged with said pole members in aligned underlying relation, next adjacent pole faces being of opposite polarity whereby next adjacent pole members are of opposite polarity, one of the top plate and permanent magnet assemblies being movable away from the other of said assemblies to separate said pole faces and pole members and further being angularly movable from a first position wherein said pole faces and pole members are in alignment to a second position wherein said pole faces and pole members are angularly offset relative to each other about an axis extending at right angles to said work engageable surface so that each of said pole members extends across a plurality of pole faces of the same polarity, a shaft extending at right angles to said axis and supported on said body for rotation relative thereto about the shaft axis and for movement about the first mentioned axis, said shaft being drivingly connected to said one of the assemblies so that movement of the shaft about said first mentioned axis will effect movement of said one of said assemblies angularly relative to said other of said assemblies between said first position and second position, and cam means on said shaft engageable with said other of said assemblies to separate said assemblies in response to rotation of the shaft about its axis.

4. A permanent magnet rotary chuck comprising a cylindrical chuck body, a top plate assembly fixedly mounted on the chuck body and extending at right angles to the rotational axis of the chuck, said top plate assembly forming a work engageable surface and including a plurality of elongated ferromagnetic pole members arranged in spaced-apart relation parallel to one another and to the work engageable surface of the top plate, a permanent magnet assembly mounted within the chuck body for movement longitudinally of and angularly about the rotational axis of the chuck, said magnet assembly including a plurality of elongated pole faces arranged in spaced-apart relation parallel to one another and to the work engageable surface of the top plate and in alignment with the pole members in underlying engagement, next adjacent pole faces being of opposite polarity so that next adjacent pole members are of opposite polarity, and an adjustment member supported on the chuck body for rotation about an axis extending radially of the chuck and for angular movement about the rotational axis of the chuck, said member being engageable with the magnet assembly to move the same away from the top plate in response to rotation of said member and to move the magnet assembly angularly about the chuck axis in response to corresponding movement of said member to position the magnet assembly with its elongated pole faces extending obliquely across a plurality of the pole members of the top plate assembly.

5. A permanent magnet rotary chuck comprising a cylindrical chuck body, a top plate assembly fixedly mounted on the chuck body and extending at right angles to the rotational axis of the chuck, said top plate assembly forming a work engageable surface and including a plurality of elongated ferromagnetic pole members arranged in parallel spaced-apart relation and extending chordally of the chuck body, a permanent magnet assembly disposed within the chuck body and movable about and longitudinally of the rotational axis of the chuck, said magnet assembly including a plurality of elongated pole pieces arranged in parallel spaced-apart relation and engaged with the pole members in underlying aligned relation, a plurality of permanent magnets disposed between said pole pieces, the magnets being polarized in a direction extending parallel to said work engageable surface and being arranged so that the magnet poles on opposite sides of a pole piece are of the same polarity, said magnet assembly being provided with an opening extending at right angles to the chuck axis, a shaft received in said opening and having cam means engageable with the magnet assembly to move the same away from the top plate assembly in response to rotation of the shaft about its axis, the chuck body being provided with a pair of circumferentially extending slots in which the end portions of said shaft are slidably engaged, a sleeve rotatably supported on the chuck body and overlying said slots, the sleeve having openings rotatably receiving the ends of said shaft, at least one end of said shaft having a tool engageable recess opening outwardly of the chuck, said shaft being drivingly connected to said magnet assembly so that said magnet assembly will be moved angularly of the chuck axis in response to movement of one end of said shaft longitudinally of the slot in the chuck body receiving the same.

6. A permanent magnet work holding device comprising a body, a top plate assembly including a plurality of elongated ferromagnetic pole members arranged in parallel spaced-apart relation transversely of the body, said pole members at least in part forming a work engageable surface parallel to the transversely extending pole members, a permanent magnet assembly including a plurality of spaced-apart elongated pole faces aligned with said pole members in underlying and magnetic contact, next adjacent pole faces being of opposite polarity whereby next adjacent pole members are of opposite polarity, means mounting the top plate and permanent magnet assemblies on the chuck body for relative movement therebetween in directions toward and away from each other and angularly of each other, and means for sequentially separating said top plate and magnet assemblies and angularly offsetting said assemblies to a position wherein the parallel pole members extend in a direction at an oblique angle to the direction of the elongated parallel magnet pole faces whereby each of the pole members extends across a plurality of magnet pole faces of like and unlike polarity.

7. A permanent magnet rotary chuck comprising a cylindrical chuck body, a top plate assembly fixedly mounted on the chuck body and extending at right angles to the rotational axis of the chuck, said top plate assembly forming a work engageable surface and including a plurality of elongated ferromagnetic pole members arranged in parallel spaced-apart relation and extending chordally of the chuck body, a permanent magnet assembly mounted within the chuck body for movement longitudinally of and about the rotational axis of the chuck, said magnet assembly providing a plurality of elongated pole faces arranged in parallel spaced-apart relation and in alignment with the pole members in underlying engagement, next adjacent pole faces being of opposite polarity so that next adjacent pole members are of opposite polarity, and means for sequentially moving said magnet assembly longitudinally of the chuck axis away from said top plate and then angularly about the chuck axis to angularly offset said pole faces and pole members whereby each of said pole members will extend across a plurality of pole faces of the same polarity in shunting relation to pole faces of opposite polarity.

References Cited in the file of this patent

UNITED STATES PATENTS

| | | |
|---|---|---|
| 2,893,551 | Pirwitz | July 7, 1959 |
| 2,918,610 | Briggs | Dec. 22, 1959 |
| 2,947,921 | Watelet | Aug. 2, 1960 |
| 2,972,485 | Ferchland | Feb. 21, 1961 |

FOREIGN PATENTS

| | | |
|---|---|---|
| 119,983 | Sweden | Oct. 21, 1947 |